United States Patent [19]
Hombach

[11] 3,931,668
[45] Jan. 13, 1976

[54] HOLDER FOR A KITCHEN UTENSIL

[76] Inventor: Carl J. Hombach, P.O. Box 22, West Hartford, Vt. 05084

[22] Filed: Mar. 28, 1975

[21] Appl. No.: 562,977

Related U.S. Application Data

[63] Continuation-in-part of Ser. No. 437,488, Jan. 28, 1974, abandoned.

[52] U.S. Cl. ............................ 24/261 A; 24/73 AS
[51] Int. Cl.² .......................................... A44B 21/00
[58] Field of Search...... 24/73 AS, 261 DS, 261 PT, 24/261 A, 261 B, 81 R, 81 FH, 81 H, 81 HH, 81 C, 81 A, 84 H, 137 A; 248/37.3, 37.6, 226 C

[56] References Cited
UNITED STATES PATENTS

| | | | |
|---|---|---|---|
| 370,942 | 10/1887 | Manington | 24/261 A |
| 799,612 | 9/1905 | Moore | 24/261 A |
| 1,196,737 | 8/1916 | Hammond | 24/261 A |
| 1,237,504 | 8/1917 | Graham | 24/261 A |
| 1,306,677 | 6/1919 | Anderson et al. | 24/261 A |
| 2,321,563 | 6/1943 | Penley | 24/84 H |

FOREIGN PATENTS OR APPLICATIONS 365,837   1/1963   Switzerland............................ 24/73

Primary Examiner—Bernard A. Gelak
Assistant Examiner—K. Dorner
Attorney, Agent, or Firm—Schiller & Pandiscio

[57] ABSTRACT

A kitchen utensil holder in combination with a clamp for mounting the holder to a pan or other container is described. The holder includes a supporting member, first and second outer loops spaced laterally from one another, first and second connectors respectfully connecting the first and second outer loops to a third inner loop having an opening that is greater than the space between the first and second loops. One of the outer loops is connected at one end to a support member. The other end of the support member is connected to a clip or clamp. The latter is adapted for attaching to the rim of a bowl or sauce pan.

11 Claims, 6 Drawing Figures

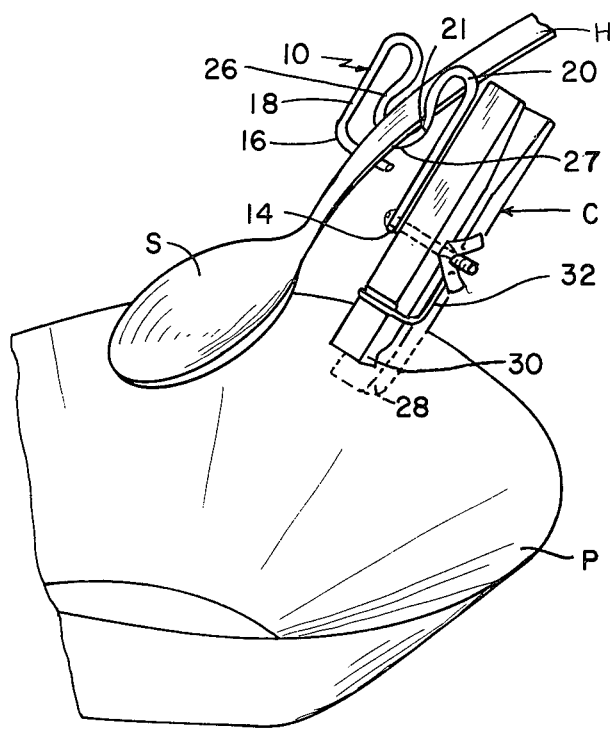
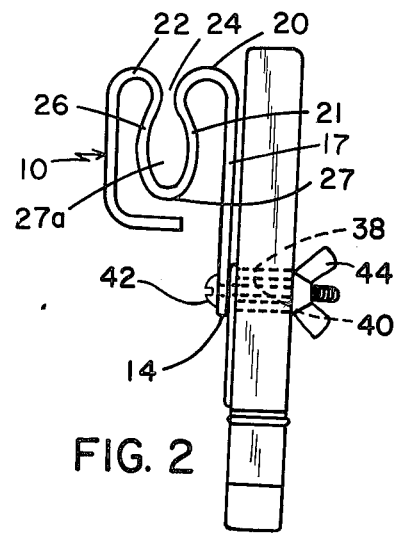
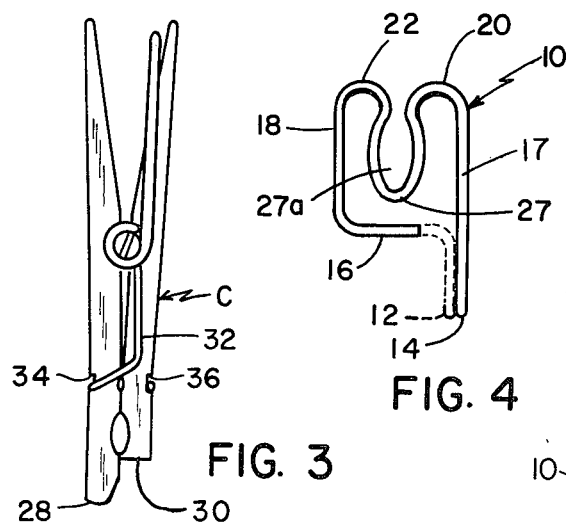
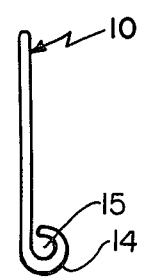
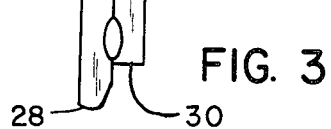
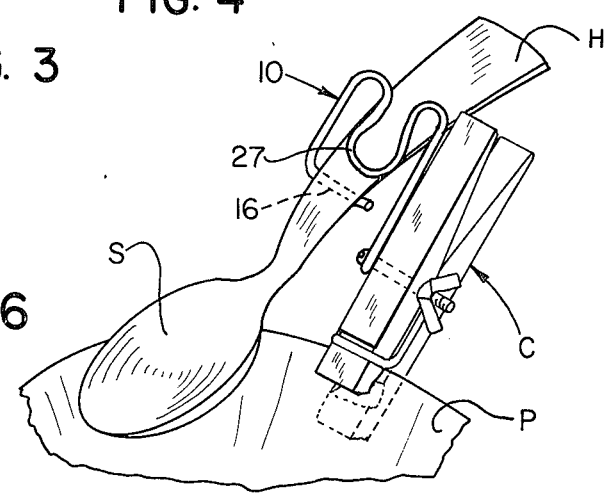

ated Jan. 28, 1974 and now abandoned.

HOLDER FOR A KITCHEN UTENSIL

The present application is a continuation-in-part of my copending application Ser. No. 437,488 filed Jan. 28, 1974 and now abandoned.

A principal object of the present invention is to provide a kitchen utensil holder in combination with a clamp for mounting the holder to a pan or other container, and for holding a utensil such as a spoon or the like in a desired position and handy to use. Another object is to provide a holder and clamp of the type described which can be adjusted to fit on the rim of a wide variety of sauce pans, pots, bowls and other like containers. Still another object is to provide a holder and clamp of the type described and in which the utensil may be readily attached to a pot or sauce pan, maintaining the utensil readily at hand for use in cooking, but so that the handle of the utensil is kept relatively cool.

The foregoing and other objects disclosed or rendered obvious by the following description are achieved by means of a novel shaped holder in combination with a clamp. Other features and advantages of the invention are disclosed or rendered obvious by the following specification and the corresponding drawings wherein:

FIG. 1 is a perspective view of a holder in combination with a clamp in accordance with the present invention, and shown mounted on the rim of a sauce pan with a spoon being held in desired position;

FIG. 2 is a front elevational view of the holder and clamp shown in FIG. 1;

FIG. 3 is a side elevational view of the clamp and holder shown in FIG. 1;

FIG. 4 is a front elevational view of the holder portion of the combination shown in FIG. 1;

FIG. 5 is a side elevational view of the holder portion shown in FIG. 4; and

FIG. 6 is a perspective view of the holder and clamp shown in FIG. 1 and shown mounted on the rim of a sauce pan, but with another shaped spoon being held in a different position.

In the drawings, like numbers refer to like parts.

Referring to FIGS. 1, 2 and 5, the holder portion indicated generally at 10 comprises first and second outer loops 20 and 22 spaced laterally from one another, and a third loop 27 connected to outer loop 20 and 22 by inwardly curved connector sections 21 and 26 respectively. Loop 27 defines an opening 27A that is somewhat greater than the space 24 between outer loops 20 and 22. Space 24 provides an entrance mouth for a spoon handle H as will become clear from the description following. The holder portion also includes a pair of parallel connector members 17 and 18 attached to the free ends of loops 20 and 22 respectively. Members 17 is somewhat longer than member 18 and terminates in a hook shaped portion 14 which defines an opening 15. Member 18 terminates in another elongate member 16. The latter extends perpendicularly from member 18 towards member 17, and is disposed in the same plane as members 17 and 18. Holder 10 is preferably formed from a single elongate rod or member such as stainless steel wire that is bent in the desired shape.

Referring now to FIGS. 1, 2 and 3, the clamp portion comprises a clip or clamp C having two oppositely disposed jaws 28 and 30. Preferably as shown in FIGS. 2, 3 and 6, one of the jaws 28 is somewhat longer than the other jaw 30, so that jaw 28 will not project into the contents of the saucepan. The jaws are held in a normally closed position by a spring biasing means 32 that holds the jaws together and also acts as a pivot. Spring biasing means 32 includes a compression spring or coil portion 38 which extends between jaws 28 and 30 in a common opening hole 40, and the straight ends of spring 38 are disposed around the outside of jaws 28 and 30, fitting into slots 34 and 36 in jaws 28 and 30 respectively. As will be obvious from the preceeding description clamp C is similar to a common clothes pin of the compression spring type.

Referring in particular to FIG. 2 holder 10 is attached to clamp C by a threaded bolt 42 that passes through hook opening 15 of the holder and through the spring coil portion 38. A threaded wing nut 44 is provided on the other end of bolt 42 and serves to hold holder 10 in desired fixed position relative to claim C when the latter is placed on a sauce pan, bowl or the like.

In use, the clamp is clipped onto the side of a bowl or pan P, adjacent the rim. Holder 10 is then adjustably connected to clamp C by bolt 42 as explained above, and the wing nut is tightened on the bolt. Then as shown in FIG. 1, the handle narrow portion of a utensil such as a spoon S is inserted into mouth 24 by turning the utensil on its edge, and the utensil is then rotated whereby the spoon handle wide portion will rest in loop 27 and be engaged by the loop and connector members 26 and 27.

Alternatively, as shown in FIG. 6, the utensil may be inserted under loop 27 between that loop and member 16 so that the utensil may then rest on member 16, and the utensil will be retained in position on member 16 by contact with the bottom of loop 27. This latter arrangement may be particularly useful for relatively large spoons or other utensils which may not fit inside loop 27.

The invention is susceptible of modification. For example, one modification of the invention is shown in dotted lines in FIG. 4. In this modification the holder 10 includes a second hook shaped member 12 extending at one end from member 16, and defining a second opening 15. The two openings 15 are aligned with one another to define a common passageway whereby bolt 42 will be inserted through the two openings. This modification may be desired for large clamps for use with relatively large, heavy utensils, e.g. as may be found in restaurants. Another possible modification is to make jaws 28 and 30 of equal length. Still other modifications will be obvious to one skilled in the art.

What is claimed is:

1. Apparatus comprising a kitchen utensil holder in combination with a clamp for mounting the holder to a pan or other container, said holder comprising first and second outer loops spaced laterally from one another, a third inner loop having an opening that is greater than the space between said first and second outer loops and connected to said outer loops by first and second connecting members, a support member attached to one of said outer loops, said support member having a portion defining an opening;

said clamp comprising two jaws and spring means normally holding said jaws in closed position, said spring means embodying a spring member that extends between and laterally of said jaws and has an opening extending therethrough;

a bolt extending through said opening and the opening in said spring member; and fastening means for fastening said bolt so as to secure said holder to said clamp in a selected position.

2. Apparatus according to claim 1 wherein said bolt is threaded and said fastening mean is a nut screwed onto said bolt.

3. Apparatus according to claim 1 further including a second support member attached to the other of said outer loops and having a portion defining an opening through which said bolt extends.

4. Apparatus according to claim 1 further including a spoon having a handle with a relatively wide face portion and a relatively narrow edge portion, the width of said face portion being such that said face portion cannot pass through the space between said first and second outer loops but can pass into the opening of said third inner loop, and the width of said edge portion being such that it can pass through the space between said first and second outer loops.

5. Apparatus according to claim 3 further including a spoon having a handle with a relatively wide face portion and a relatively narrow edge portion, the width of said face portion being such that said face portion cannot pass through the space between said first and second outer loops or into the opening of said third loop, and the width of said edge portion being such that it can pass through the space between the bottom of said inner loop and said second support member.

6. Apparatus according to claim 1 wherein one of said clamp jaws is longer than the other of said jaws.

7. Apparatus comprising a kitchen utensil holder in combination with a clamp for mounting the holder to a pan or other container, said holder comprising first and second supports disposed opposite to one another, first and second laterally extending openings in said first and second supports respectively, said first and second openings being aligned with one another, first and second outer loops spaced laterally from one another, first and second connectors respectively connecting said first and second outer loops to said first and second supports respectively, a third inner loop having an opening that is greater than the space between said first and second outer loops, and third and fourth connectors respectively connecting said third inner loop to said first and second outer loops;

said clamp comprising two jaws and spring means normally holding said jaws in closed position, said spring means embodying a spring member that extends between and laterally of said jaws and has an opening extending therethrough;

a bolt extending through said first and second openings and the opening in said spring member; and fastening means for fastening said bolt so as to secure said holder to said clamp in a selected position.

8. Apparatus according to claim 7 wherein said bolt is threaded and said fastening means is a nut screwed onto said bolt.

9. Apparatus according to claim 7 further including a spoon having a handle with a relatively wide face portion and a relatively narrow edge portion, the width of said face portion being such that said face portion cannot pass through the space between said first and second outer loops but can pass into the opening of said third inner loop, and the width of said edge portion being such that it can pass through the space between said first and second outer loops.

10. Apparatus according to claim 7 wherein one of said first and second connectors has a straight portion directly connecting one of said outer loops to one of said first and second supports, and further wherein said bolt extends at substantially a right angle to said straight portion.

11. Apparatus according to claim 7 wherein one of said clamp jaws is longer than the other jaw.

* * * * *